(12) United States Patent
Liu et al.

(10) Patent No.: US 11,969,846 B2
(45) Date of Patent: Apr. 30, 2024

(54) IN-SITU FREEZING MACHINING METHOD FOR INTEGRATED THIN-WALLED ARRAY STRUCTURE

(71) Applicant: DALIAN UNIVERSITY OF TECHNOLOGY, Liaoning (CN)

(72) Inventors: Haibo Liu, Liaoning (CN); Chengxin Wang, Liaoning (CN); Yongqing Wang, Liaoning (CN); Xu Li, Liaoning (CN); Kuo Liu, Liaoning (CN); Xiaofei Ma, Liaoning (CN); Dongming Guo, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 17/785,657

(22) PCT Filed: Nov. 17, 2021

(86) PCT No.: PCT/CN2021/131063
§ 371 (c)(1),
(2) Date: Jun. 15, 2022

(87) PCT Pub. No.: WO2023/273105
PCT Pub. Date: Jan. 5, 2023

(65) Prior Publication Data
US 2024/0075568 A1 Mar. 7, 2024

(30) Foreign Application Priority Data
Jun. 28, 2021 (CN) .......................... 202110718338.0

(51) Int. Cl.
*B23Q 3/08* (2006.01)
*B23Q 3/06* (2006.01)

(52) U.S. Cl.
CPC ............. *B23Q 3/086* (2013.01); *B23Q 3/065* (2013.01); *B23Q 2703/10* (2013.01)

(58) Field of Classification Search
CPC ...................................................... B23Q 3/086
See application file for complete search history.

(56) References Cited

U.S. PATENT DOCUMENTS 3,899,379 A * 8/1975 Wanesky ............... B23Q 3/086
156/80

FOREIGN PATENT DOCUMENTS

| CN | 103100907 A | * | 5/2013 |
| CN | 103100907 A |   | 5/2013 |

(Continued)

*Primary Examiner* — Jacob J Cigna
(74) *Attorney, Agent, or Firm* — Muncy, Geissler, Olds & Lowe, P.C.

(57) ABSTRACT

The present invention proposes an in-situ freezing machining method for an integrated thin-walled array structure. In the method, the area among cups is cut off first; then, the outer walls of a cup array are machined; and finally, water filling and freezing are carried out, and in-situ freezing machining of the inner walls of the cup array is carried out. Then, hoisting and turning over are carried out, and the area among cavities is cut off; then, the outer walls of a cavity array are machined; and finally, water filling and freezing are carried out, and in-situ freezing machining of the inner walls of the cavity array is carried out. The method realizes in-situ freezing clamping of workpieces, avoids error accumulation caused by repeated installation of a fixture, and can refrigerate efficiently, suppress ambient and cutting thermal interference, and ensure the stability of freezing fixture.

2 Claims, 12 Drawing Sheets

(56) References Cited

FOREIGN PATENT DOCUMENTS

| | | | | |
|---|---|---|---|---|
| CN | 105171460 | A * | 12/2015 | |
| CN | 105171460 | A | 12/2015 | |
| CN | 109894888 | A * | 6/2019 | ............ B23Q 3/086 |
| CN | 109894888 | A | 6/2019 | |
| CN | 110103055 | A * | 8/2019 | ............ B23Q 3/065 |
| CN | 110103055 | A | 8/2019 | |
| CN | 111266897 | A * | 6/2020 | ............ B23Q 3/086 |
| CN | 111266897 | A | 6/2020 | |
| CN | 211805061 | U * | 10/2020 | |
| CN | 211805061 | U | 10/2020 | |
| CN | 113478269 | A * | 10/2021 | |
| CN | 113478269 | A | 10/2021 | |
| KR | 101860887 | B1 * | 5/2018 | |
| KR | 101860887 | B1 | 5/2018 | |

* cited by examiner

IN-SITU FREEZING MACHINING METHOD FOR INTEGRATED THIN-WALLED ARRAY STRUCTURE

TECHNICAL FIELD

The present invention belongs to the technical field of machining, and relates to an in-situ freezing machining method for an integrated thin-walled array structure.

BACKGROUND

The integrated thin-walled array structure is widely used in sophisticated equipment in aerospace and other fields, and has the characteristics of complex structure and weak rigidity, which increases the clamping difficulty in the machining process, thus leads to low machining efficiency and precision and poor surface integrity, and ultimately reduces the service performance. Therefore, how to achieve high-performance clamping of the integrated thin-walled array structure is one of the core problems to be urgently solved in the field.

At present, the common fixture modes for thin-walled parts mainly include bespoke fixture, box-joint reconfigurable fixture, conformable fixture, modular fixture and adsorption fixture. For the bespoke fixture, the technology is simple, the efficiency is high, but the mold needs to be customized based on the geometry of a workpiece, so the flexibility is poor, the cost is high and the technological cycle is long. For the box-joint reconfigurable fixture, a corresponding fixture frame can be constructed according to the shape and size of a workpiece, but only the whole clamping of the workpiece can be realized, and the fixture mode is difficult to adapt to the machining process. For the conformable fixture, the lattice layout can be adjusted according to the geometry of a workpiece to match with the surface contour of the workpiece, but the contact point of the fixture and the workpiece may produce surface scratches and clamping stress, which reduces surface quality. The modular fixture has high flexibility, is a standard fixture and can be combined randomly according to the configuration of a workpiece to realize clamping. However, the manufacture cost of the modular fixture is extremely high, the installation and adjustment time is long, and the clamping efficiency is low. In addition, the combination of modular fixture units easily causes error accumulation and reduces the clamping precision. For the adsorption fixture, a workpiece is clamped by air pressure, but a sucker is in direct contact with the surface of the workpiece, which easily causes wear, air leakage and other phenomena. Due to the limitation of structure and performance, it is difficult to achieve high-performance clamping and machining of the integrated thin-walled array structure by the above fixture modes. Therefore, it is urgent to develop an in-situ freezing machining method for an integrated thin-walled array structure to improve the clamping reliability and machining efficiency and meet the requirements of high-precision and high-performance manufacturing of such thin-walled parts.

The patent CN201910123624.5 of Dalian University of Technology discloses a freezing supporting device and method for a large thin-walled part. Ice with a certain thickness is formed on the supporting side of a machining zone through a freezing system and an auxiliary system to realize freezing support of a large thin-walled part, and with the progress of machining, the ice is always used as the support to have the effect of follow-up support. However, the contact area between the support and the surface of the thin-walled part in the patent is small, so the overall stability of the machining process cannot be ensured. The patent CN202020249319.9 of Suzhou Jincheng Precision Die Casting Co., Ltd. discloses a freezing thin-walled auxiliary machining device for aluminum alloy parts. The rigid support for workpiece machining is realized by placing aluminum alloy parts in a thin-walled cavity as well as water filling and freezing to prevent deformation; however, the thermal loss of freezing caused by machining heat is not considered in the patent.

The in-situ freezing machining method for an integrated thin-walled array structure is not mentioned in the above researches.

SUMMARY

To overcome the defects of the above methods, the present invention provides an in-situ freezing machining method for an integrated thin-walled array structure aiming at the problems of clamping and machining of the integrated thin-walled array structure. The present invention designs an in-situ freezing fixturing system, realizes in-situ freezing clamping of workpieces, avoids error accumulation caused by repeated installation of a fixture, and can refrigerate efficiently, suppress ambient and cutting thermal interference, and ensure the stability of freezing clamping. In the present invention, the fluidity of water is used to fill the space of the thin-walled array structure before water freezing so as to ensure close fitting with the surface of a workpiece after water freezing; the freezing rigidity is used to provide reliable support for the machining process so as to achieve the effects of suppressing vibration and reducing machining deformation; the freezing stickiness is used to effectively clamp a workpiece so as to maintain the stability of the machining process; and the low-temperature performance of ice is used to reduce cutting heat so as to avoid thermal stress.

The present invention adopts the following technical solution:

An in-situ freezing fixturing system for an integrated thin-walled array structure is composed of a freezing device, an auxiliary device and a refrigeration system.

The freezing device mainly comprises an in-situ freezing fixturing shell 11 and an insulation lid 6; the in-situ freezing fixturing shell 11 has the function of heat preservation and is provided with a refrigeration tube inside, and refrigeration is realized through flow of liquid nitrogen in the refrigeration tube; and the insulation lid 6 is used for heat preservation in the freezing process. The auxiliary device mainly comprises clamps 14, a template 7 and locators 13, wherein the template 7 is arranged in the in-situ freezing fixturing shell 11, and the locators 13 and the template 7 are used for locating a blank 15; and the clamps 14 are used for clamping the edge of the blank 15. The refrigeration system mainly comprises a liquid nitrogen ($LN_2$) tank 8, a nozzle 5 and refrigeration equipment 12, wherein the refrigeration equipment 12 is connected with the refrigeration tube in the in-situ freezing fixturing shell 11 to control the flow of liquid nitrogen into the in-situ freezing fixturing shell 11 so as to realize the control of the refrigeration power; and the nozzle 5 is connected with the liquid nitrogen ($LN_2$) tank 8 to realize local spraying of liquid nitrogen for machining.

An in-situ freezing machining method for an integrated thin-walled array structure based on the in-situ freezing fixturing system is provided. First, machining of a cup array 1 is carried out, the area among cups in the cup array 1 is cut off, and edge material for cup array 18 is reserved. Second, rough machining and finish machining of the outer walls of the cup array 1 are carried out, and then rough machining of the inner walls of the cup array 1 is carried out. Finally, water filling and freezing are carried out in a cup array groove 17 formed by the edge material for cup array 18 and in the cup array 1, and in-situ freezing machining of the inner walls of the cups in the cup array 1 is carried out. Hoisting and turning over are carried out, and machining of a cavity array 2 is carried out. First, the area among cavities in the cavity array 2 is cut off, and edge material for cavity array 23 is reserved. Second, rough machining and finish machining of the outer walls of the cavity array 2 are carried out, and then rough machining of the inner walls of the cavity array 2 is carried out. Finally, water filling and freezing are carried out in a cavity array groove 22 formed by the edge material for cavity array 23 and in the cavity array 2, and in-situ freezing machining of the inner walls of the cavities in the cavity array 2 is carried out. The specific implementation steps are as follows:

Step 1: In-Situ Freezing Machining of Cup Array

Fixing the in-situ freezing fixturing shell 11 on a machine tool platform 9 by locating pins 10, wherein the template 7, the clamps 14 and the locators 13 are fixedly connected in the in-situ freezing fixturing shell 11, and hoisting the blank 15 onto the template 7, wherein the template 7 is provided with a cup slot 21 matched with the cup array 1, and the surface of the template 7 is coated with a water layer 16; locating the side surface of the blank 15 by the locators 13, and compressing the edge of the blank 15 by the clamps 14; machining the cup array 1 by a cutter 4: first, cutting off the area among cups in the cup array 1, and reserving edge material for cup array 18 to form a cup array groove 17; second, carrying out rough machining and finish machining of the outer walls of the cups; finally, carrying out rough machining of the inner walls of the cups; and cleaning up chips, filling water 19 in the cup array groove 17 and the cup array 1, covering the in-situ freezing fixturing shell 11 with the insulation lid 6, starting the refrigeration equipment 12, and controlling the in-situ freezing fixturing shell 11 to refrigerate and freeze the water 19. After freezing, removing the insulation lid 6, carrying out in-situ freezing machining of the inner walls of the cups in the cup array 1 by the cutter 4, and during machining, keeping the refrigerating effect of the refrigeration equipment 12 and the in-situ freezing fixturing shell 11 all the time to prevent melting of ice 20 caused by ambient thermal interference. Connecting the nozzle 5 with the liquid nitrogen ($LN_2$) tank 8, and following the machining track to carry out local spraying of liquid nitrogen for machining to avoid melting of the ice 20 caused by cutting heat. After completing in-situ freezing machining, melting the ice 20 and draining waste water; and during the process of cutting off the edge material for cup array 18, to avoid dents on the surface of the substrate 3 caused by the clamps 14, removing the clamps 14 and the locators 13, freezing the water layer 16 into an ice layer 24 under the refrigeration conditions of the refrigeration equipment 12 and the in-situ freezing fixturing shell 11, clamping a workpiece by using the freezing stickiness of the ice layer 24, and completing cutoff of the edge material for cup array 18.

Step 2: In-Situ Freezing Machining of Cavity Array

Hoisting and turning over, and inserting the cup array 1 into the cup slot 21 of the template 7, wherein the surface of the template 7 is coated with a water layer 16; locating the workpiece by the locators 13, and compressing the workpiece by the clamps 14; machining the cavity array 2 by the cutter 4: first, cutting off the area among cavities in the cavity array 2, and reserving edge material for cavity array 23 to form a cavity array groove 22; second, carrying out rough machining and finish machining of the outer walls of the cavities; finally, carrying out rough machining of the inner walls of the cavities; and cleaning up chips, filling water 19 in the cavity array groove 22 and the cavity array 2, covering the in-situ freezing fixturing shell 11 with the insulation lid 6, starting the refrigeration equipment 12, and controlling the in-situ freezing fixturing shell 11 to refrigerate and freeze the water 19. After freezing, removing the insulation lid 6, carrying out in-situ freezing machining of the inner walls of the cavities in the cavity array 2 by the cutter 4, and during machining, keeping the refrigerating effect of the refrigeration equipment 12 and the in-situ freezing fixturing shell 11 all the time to prevent melting of the ice 20 caused by ambient thermal interference. Connecting the nozzle 5 with the liquid nitrogen ($LN_2$) tank 8, and following the machining track to carry out local spraying of liquid nitrogen for machining to avoid melting of the ice 20 caused by cutting heat. After completing in-situ freezing machining, melting the ice 20 and draining waste water; and during the process of cutting off the edge material for cavity array 23, to avoid dents on the surface of the substrate 3 caused by the clamps 14, removing the clamps 14 and the locators 13, freezing the water layer 16 into an ice layer 24 under the refrigeration conditions of the refrigeration equipment 12 and the in-situ freezing fixturing shell 11, clamping the workpiece by using the freezing stickiness of the ice layer 24, and completing cutoff of the edge material for cavity array 23.

At this point, the machining of the integrated thin-walled array structure is completed.

The present invention has the following beneficial effects: the present invention proposes an in-situ freezing machining method for an integrated thin-walled array structure, realizes in-situ freezing clamping of workpieces, avoids error accumulation caused by repeated installation of the fixture, and can refrigerate efficiently, suppress ambient and cutting thermal interference, and ensure the stability of freezing fixture. The present invention makes full use of the characteristics of fluidity of water and the rigidity, freezing stickiness and low temperature of ice to realize high performance clamping of in-situ freezing matched with the machining process, effectively suppress the problems of machining flutter, deformation and low machining efficiency caused by weak rigidity and strong time-varying of the integrated thin-walled array structure, and obtain the optimal machining surface quality and precision.

In the figures, 1—cup array; 2—cavity array; 3—substrate; 4—cutter; 5—nozzle; 6—insulation lid; 7—template; 8—liquid nitrogen (LN$_2$) tank; 9—machine tool platform; 10—locating pin; 11—in-situ freezing fixturing shell; 12—refrigeration equipment; 13—locator; 14—clamp; 15—blank; 16—water layer; 17—cup array groove; 18—edge material for cup array; 19—water; 20—ice; 21—cup slot; 22—cavity array groove; 23—edge material for cavity array; 24—ice layer.

DETAILED DESCRIPTION

The embodiments of the present invention are described below in detail in combination with drawings and the technical solution.

Figure 1:
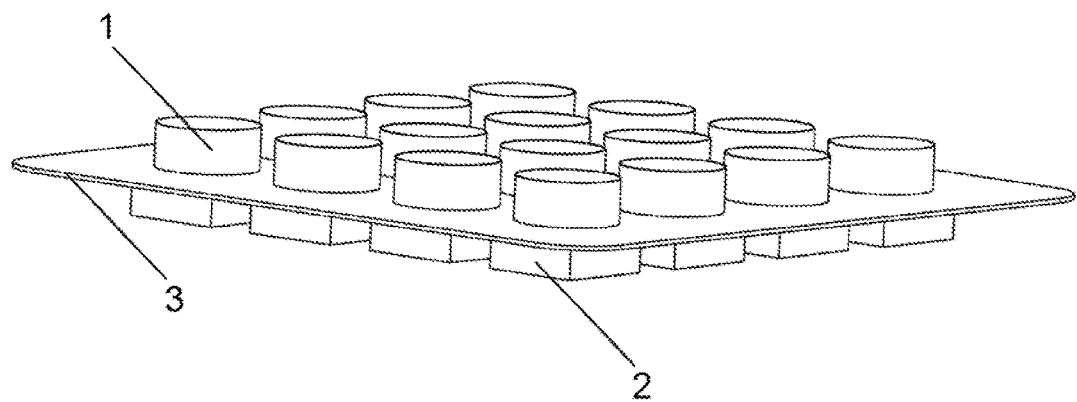
FIG. 1 is a schematic diagram of an integrated thin-walled array structure.
Figure 2:
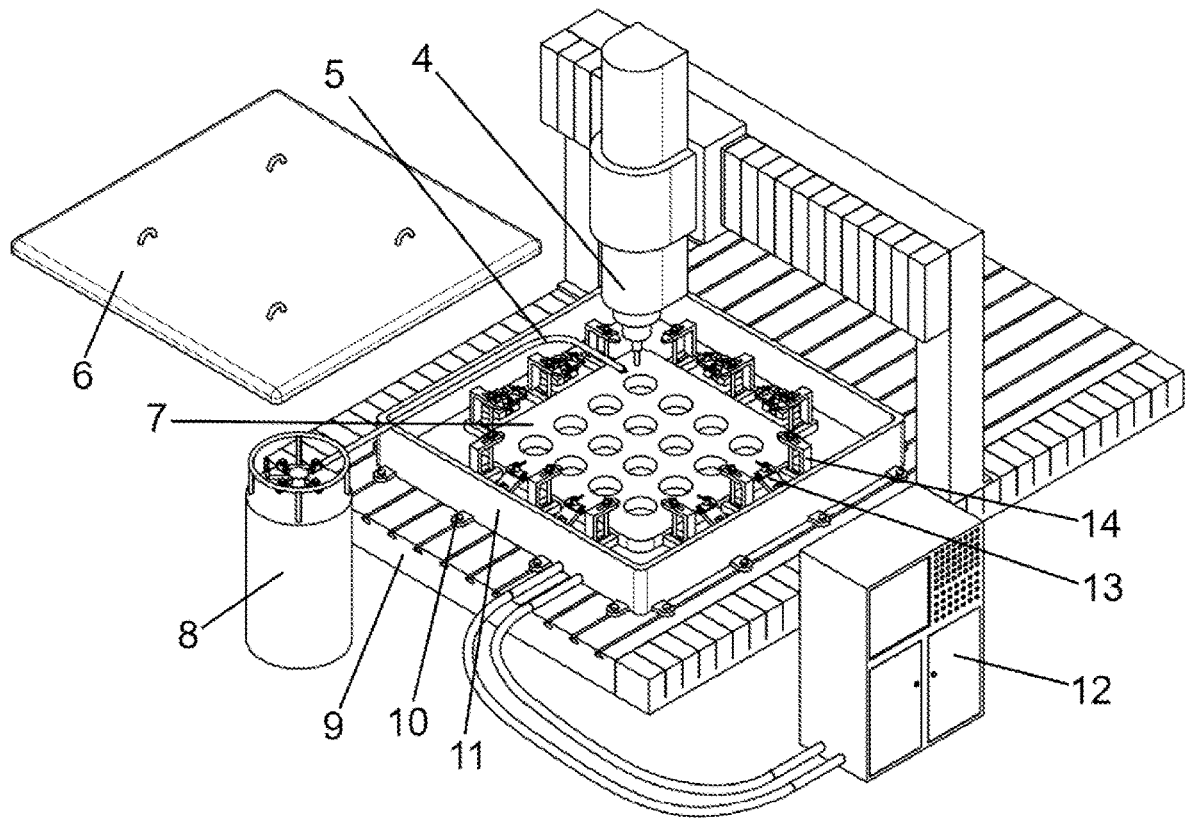
FIG. 2 is a schematic diagram of an in-situ freezing fixturing system.

As shown in FIG. 1, the integrated thin-walled array structure is made of aluminum alloy and is a 4*4 double-faced array, one face is the cup array 1, the other face is the cavity array 2, and the size of the substrate 3 is 1600 mm*1600 mm*0.8 mm; each cup has the height of 100 mm, the wall thickness of 0.8 mm and the outer wall diameter of 200 mm; and each cavity has the height of 100 mm, the wall thickness of 0.8 mm and the outer wall size of 220 mm*220 mm.

The method comprises the following specific steps:

Step 1: In-Situ Freezing Machining of Cup Array

Figure 3:
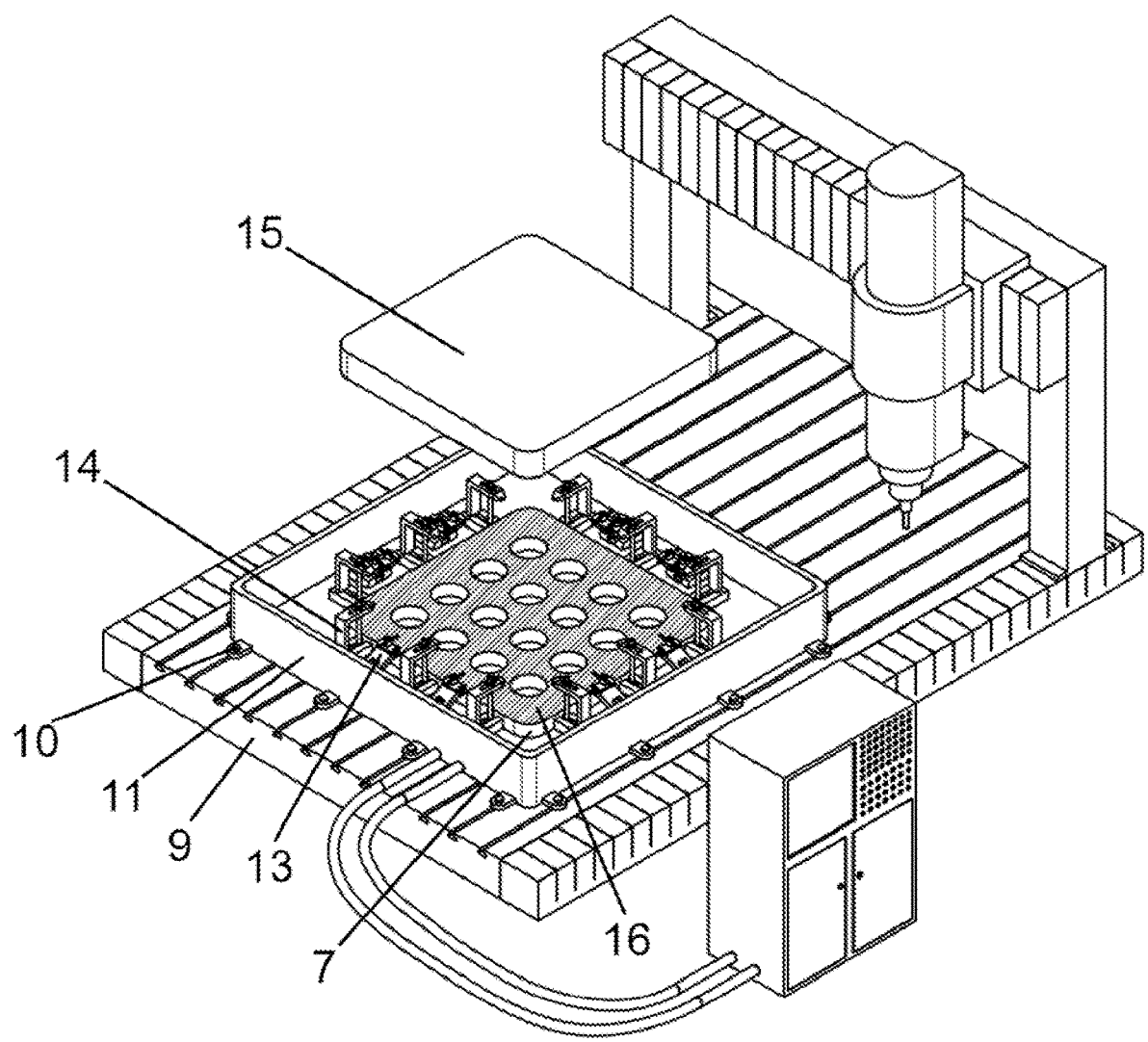
FIG. 3 is a schematic diagram of blank fixation.
Figure 4:
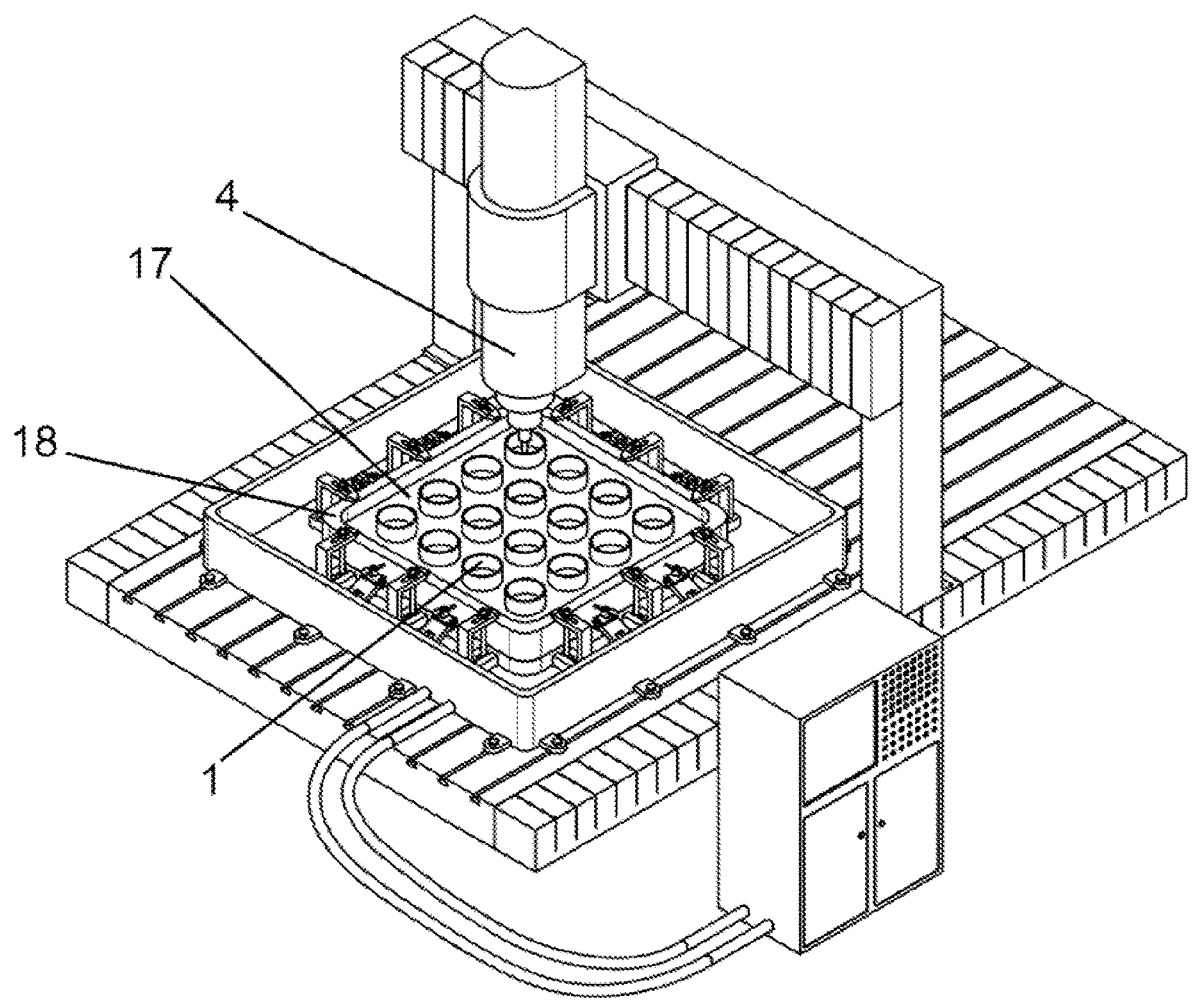
FIG. 4 is a schematic diagram of rough machining of cup array.
Figure 5:
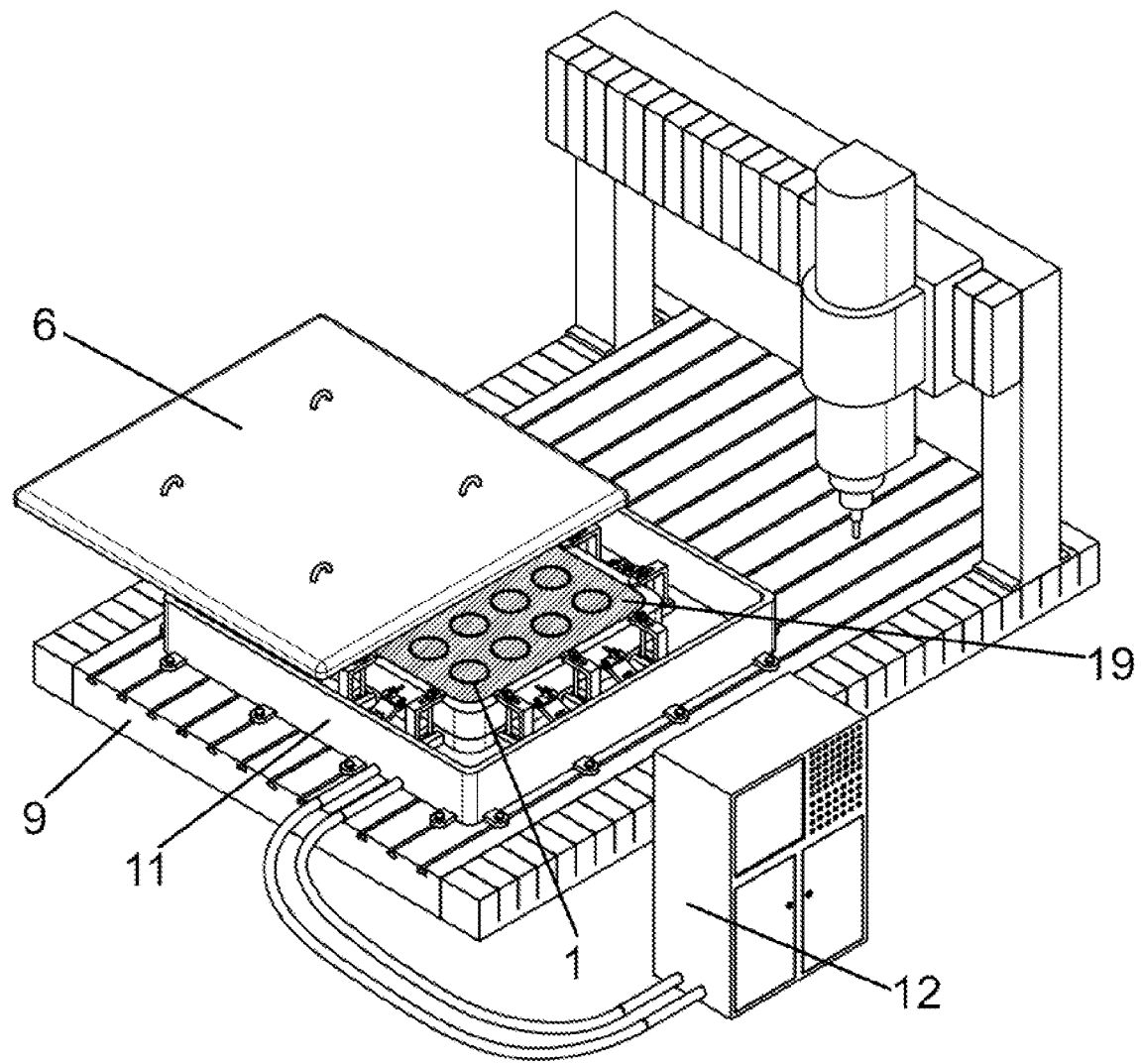
FIG. 5 is a schematic diagram of in-situ water filling and freezing of cup array.
Figure 6:
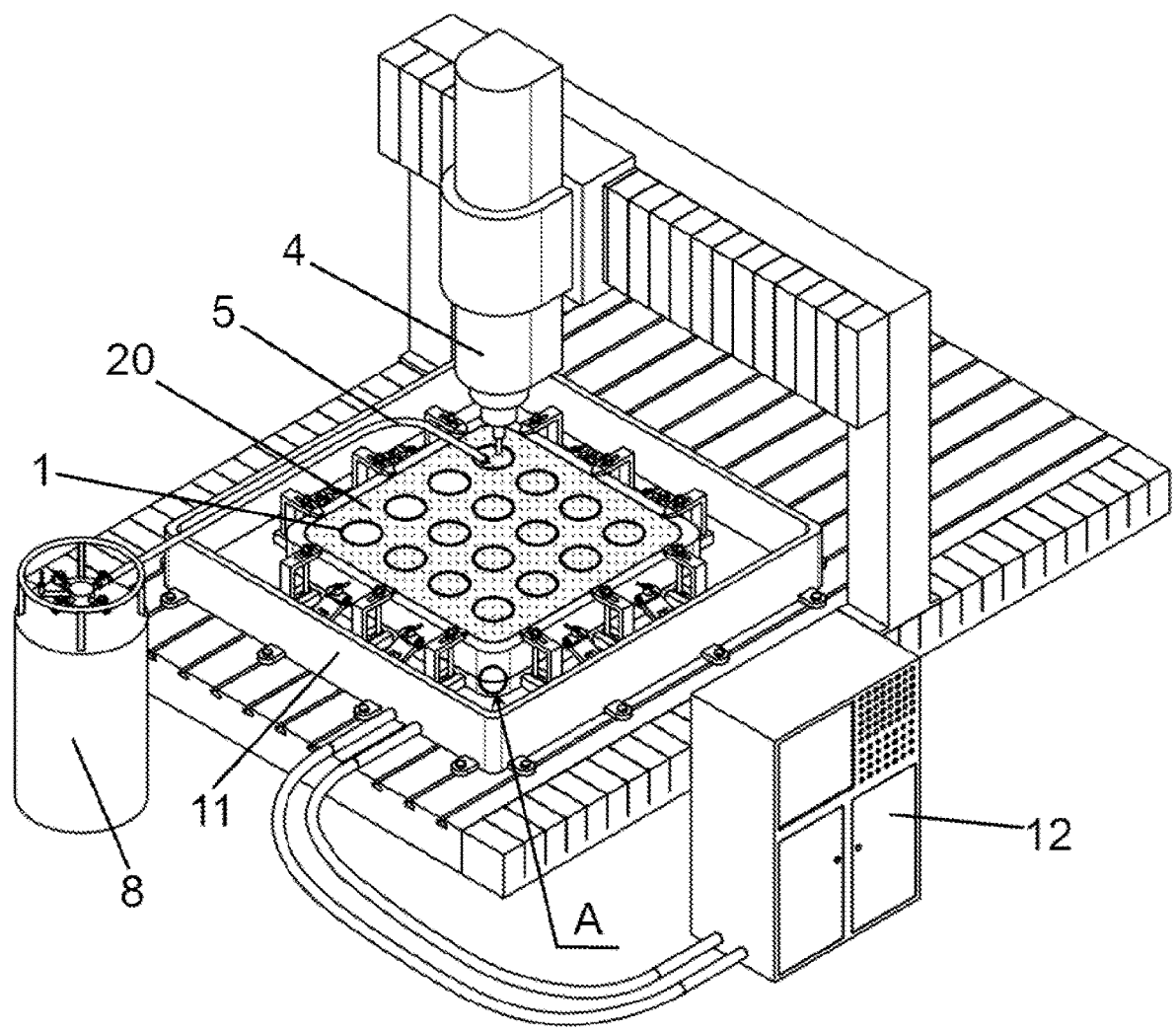
FIG. 6 is a schematic diagram of in-situ freezing machining of cup array.
Figure 7:
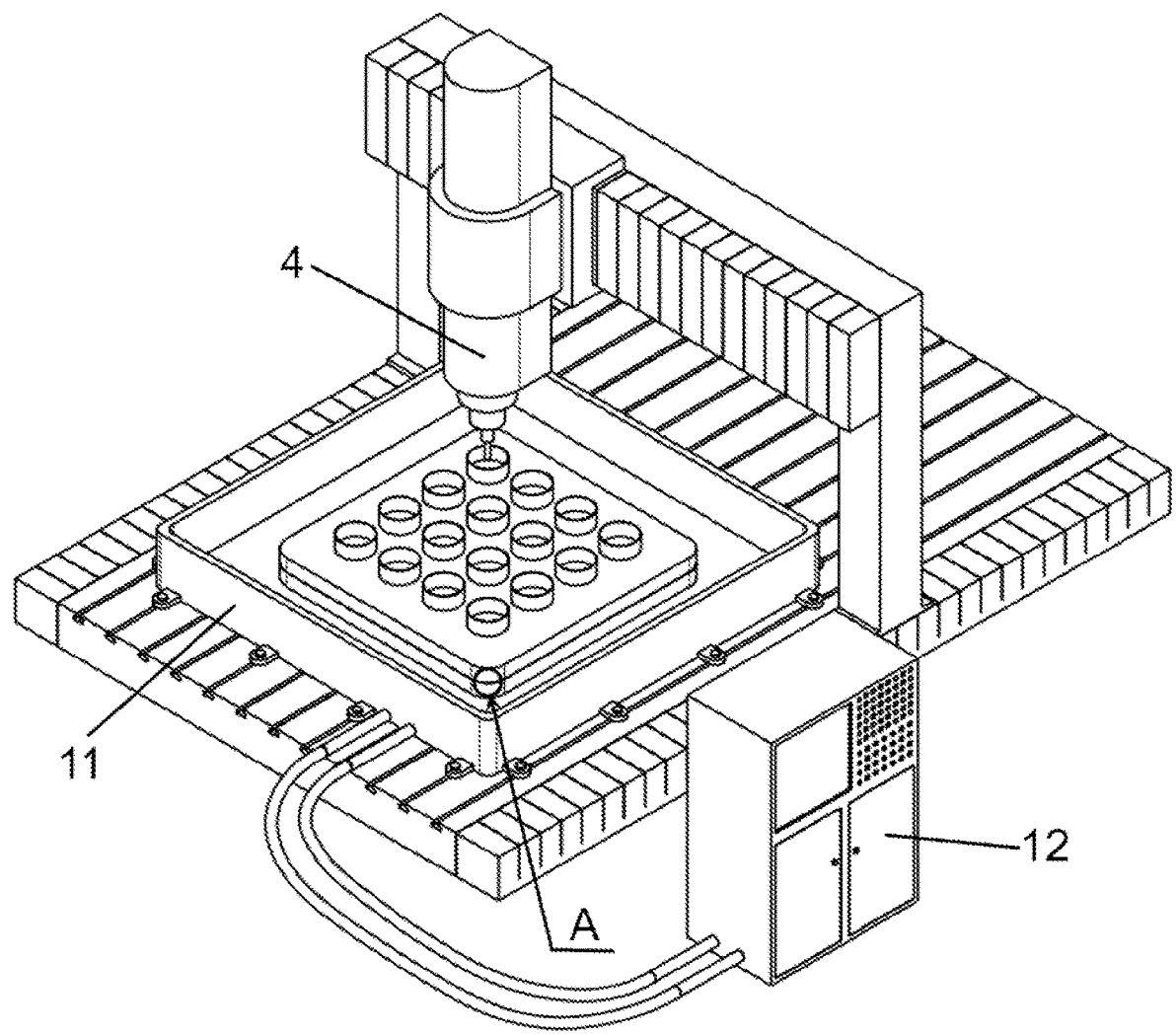
FIG. 7 is a schematic diagram of removal of edge material from cup array face.
Figure 13:
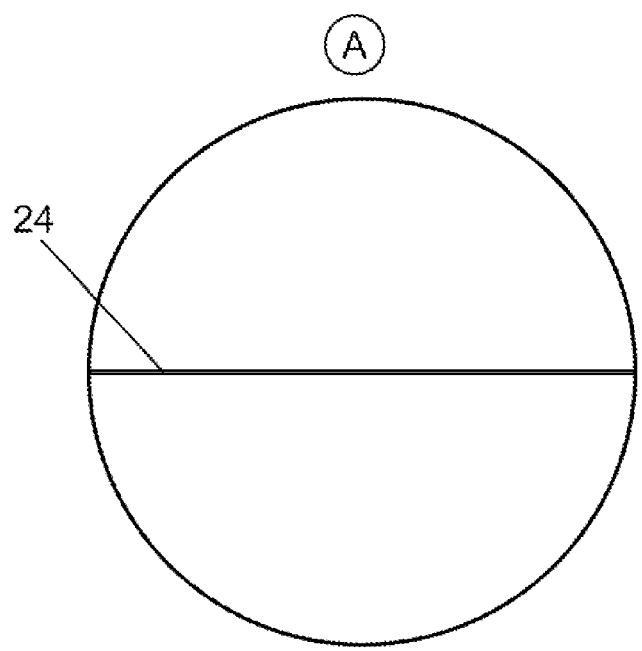
FIG. 13 is an enlarged view of A in FIG. 6, FIG. 7, FIG. 11 and FIG. 12.

Fixing the in-situ freezing fixturing shell 11 on a machine tool platform 9 by locating pins 10, wherein the template 7, the clamps 14 and the locators 13 are fixedly connected in the in-situ freezing fixturing shell 11, and hoisting the blank 15 onto the template 7, wherein the template 7 is provided with a cup slot 21 matched with the cup array 1, and the surface of the template 7 is coated with a water layer 16; locating the side surface of the blank 15 by the locators 13, and compressing the edge of the blank 15 by the clamps 14, as shown in FIG. 3; machining the cup array 1 by a cutter 4: first, cutting off the area among cups in the cup array 1, and reserving edge material for cup array 18 to form a cup array groove 17; second, carrying out rough machining and finish machining of the outer walls of the cups; finally, carrying out rough machining of the inner walls of the cups, as shown in FIG. 4; and cleaning up chips, filling water 19 in the cup array groove 17 and the cup array 1, covering the in-situ freezing fixturing shell 11 with the insulation lid 6, starting the refrigeration equipment 12, and controlling the in-situ freezing fixturing shell 11 to refrigerate and freeze the water 19, as shown in FIG. 5. After freezing, removing the insulation lid 6, carrying out in-situ freezing machining of the inner walls of the cups in the cup array 1 by the cutter 4, and during machining, keeping the refrigerating effect of the refrigeration equipment 12 and the in-situ freezing fixturing shell 11 all the time to prevent melting of ice 20 caused by ambient thermal interference. Connecting the nozzle 5 with the liquid nitrogen (LN$_2$) tank 8, and following the machining track to carry out local spraying of liquid nitrogen for machining to avoid melting of the ice 20 caused by cutting heat, as shown in FIG. 6. After completing in-situ freezing machining, melting the ice 20 and draining waste water; and during the process of cutting off the edge material for cup array 18, to avoid dents on the surface of the substrate 3 caused by the clamps 14, removing the clamps 14 and the locators 13, freezing the water layer 16 into an ice layer 24 under the refrigeration conditions of the refrigeration equipment 12 and the in-situ freezing fixturing shell 11, clamping a workpiece by using the freezing stickiness of the ice layer 24, as shown in FIG. 13, and completing cutoff of the edge material for cup array 18, as shown in FIG. 7.

Step 2: In-Situ Freezing Machining of Cavity Array

Figure 8:
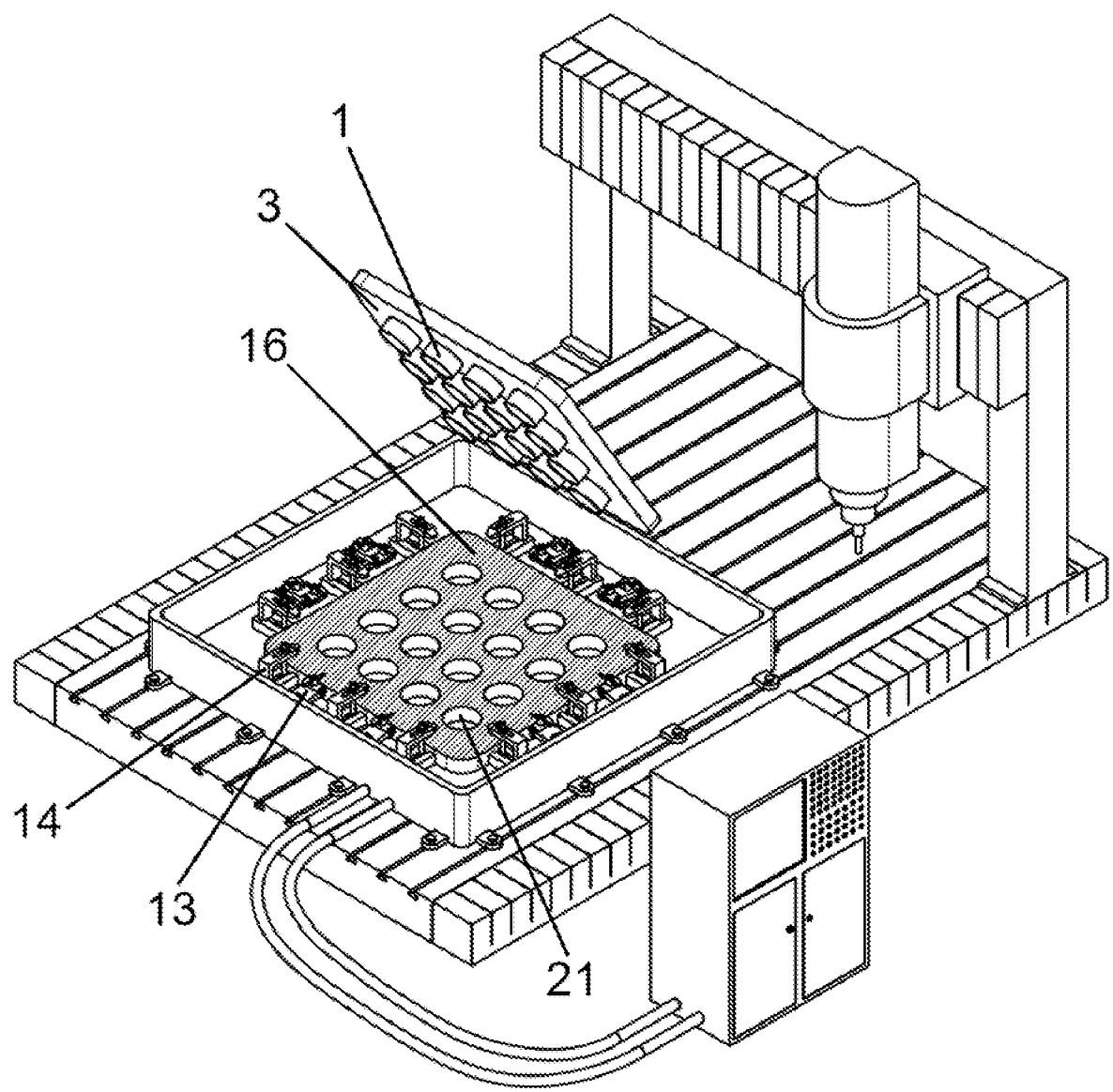
FIG. 8 is a schematic diagram of hoisting and turning over.
Figure 9:
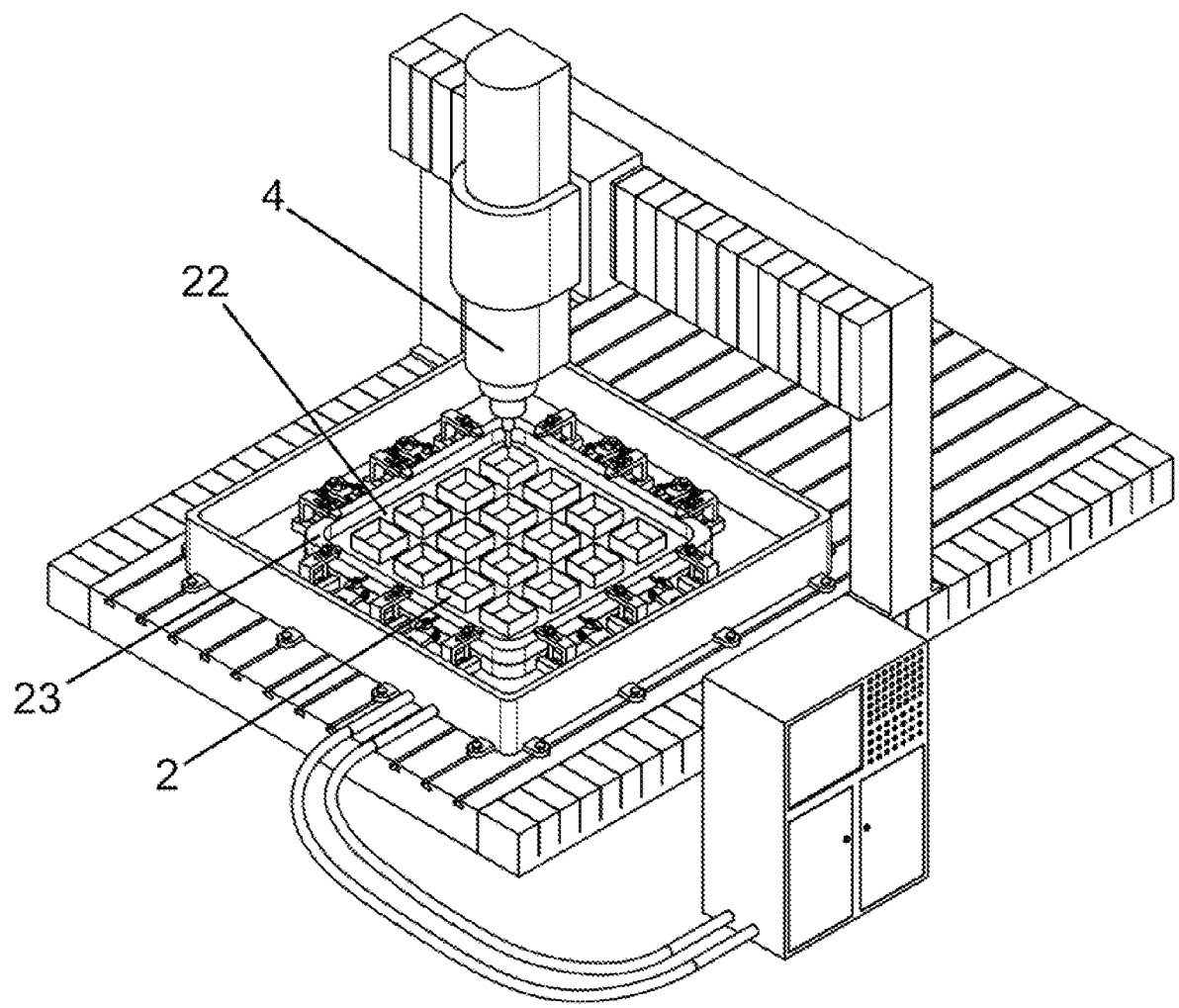
FIG. 9 is a schematic diagram of rough machining of cavity array.
Figure 10:
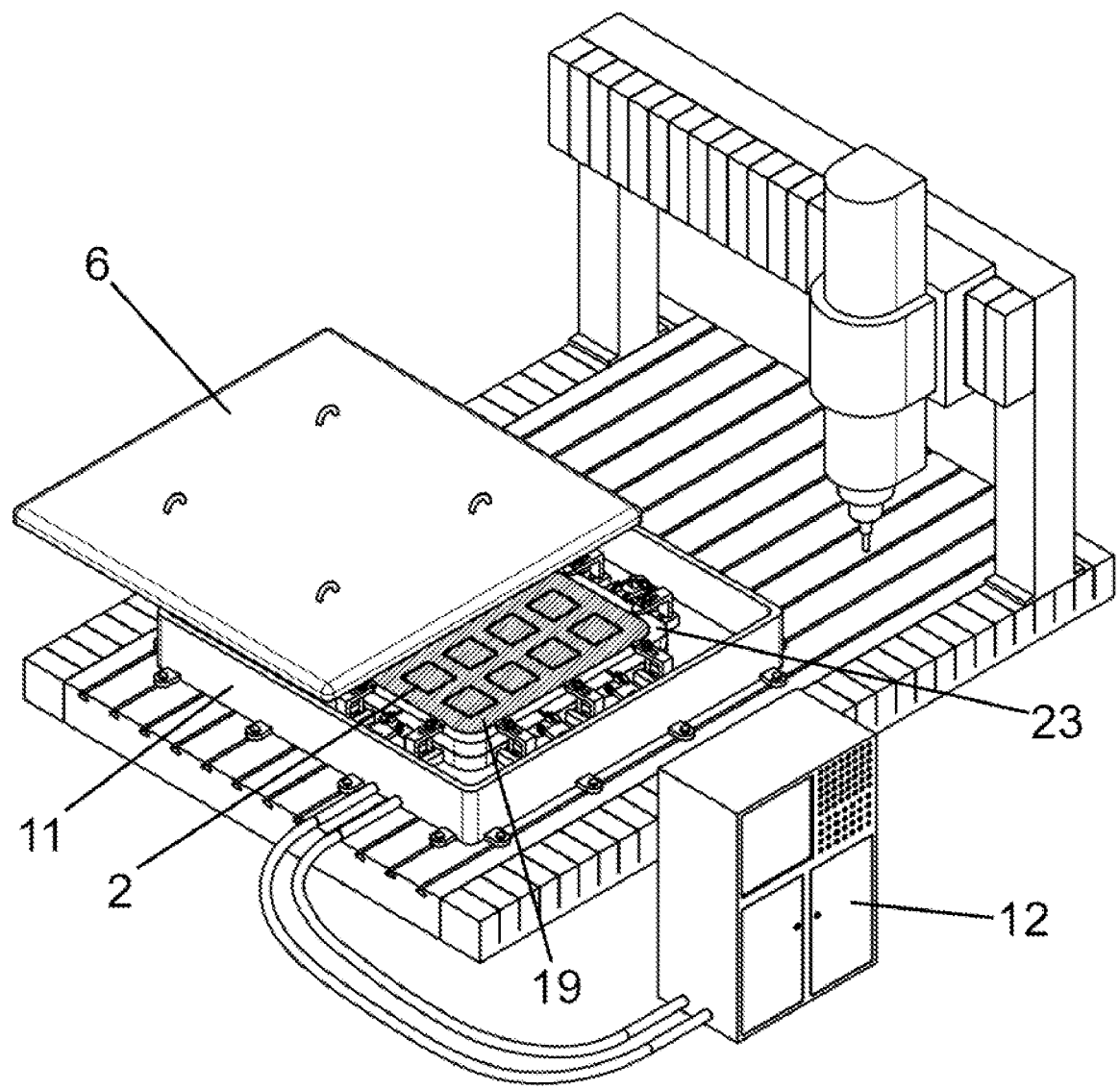
FIG. 10 is a schematic diagram of in-situ water filling and freezing of cavity array.
Figure 11:
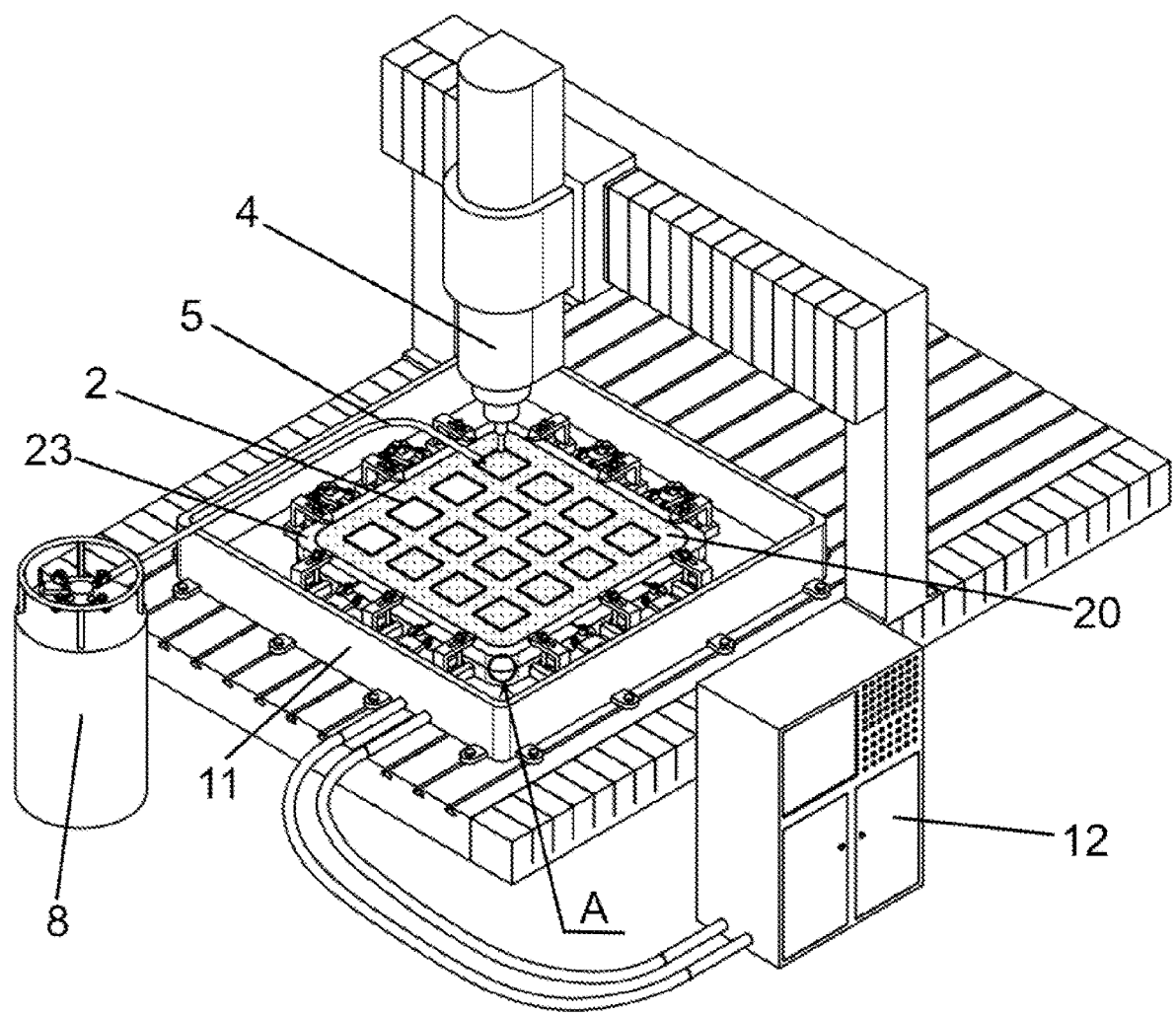
FIG. 11 is a schematic diagram of in-situ freezing machining of cavity array.
Figure 12:
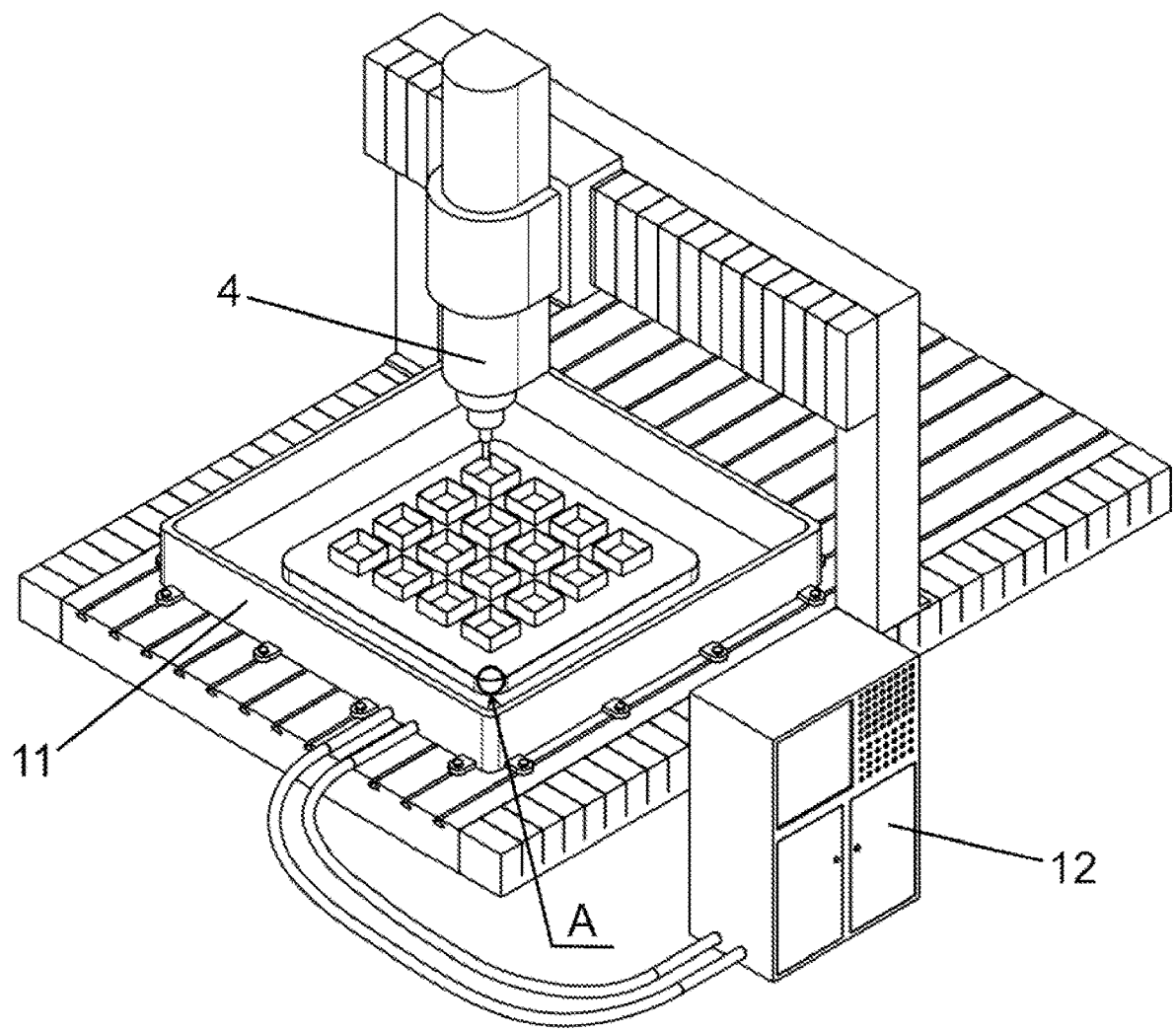
FIG. 12 is a schematic diagram of removal of edge material from cavity array face.

Hoisting and turning over, and inserting the cup array 1 into the cup slot 21 of the template 7, wherein the surface of the template 7 is coated with a water layer 16; locating the workpiece by the locators 13, and compressing the workpiece by the clamps 14, as shown in FIG. 8; machining the cavity array 2 by the cutter 4: first, cutting off the area among cavities in the cavity array 2, and reserving edge material for cavity array 23 to form a cavity array groove 22; second, carrying out rough machining and finish machining of the outer walls of the cavities; finally, carrying out rough machining of the inner walls of the cavities, as shown in FIG. 9; and cleaning up chips, filling water 19 in the cavity array groove 22 and the cavity array 2, covering the in-situ freezing fixturing shell 11 with the insulation lid 6, starting the refrigeration equipment 12, and controlling the in-situ freezing fixturing shell 11 to refrigerate and freeze the water 19, as shown in FIG. 10. After freezing, removing the insulation lid 6, carrying out in-situ freezing machining of the inner walls of the cavities in the cavity array 2 by the cutter 4, and during machining, keeping the refrigerating effect of the refrigeration equipment 12 and the in-situ freezing fixturing shell 11 all the time to prevent melting of the ice 20 caused by ambient thermal interference. Connecting the nozzle 5 with the liquid nitrogen (LN$_2$) tank 8, and following the machining track to carry out local spraying of liquid nitrogen for machining to avoid melting of the ice 20 caused by cutting heat, as shown in FIG. 11. After completing in-situ freezing machining, melting the ice 20 and draining waste water; and during the process of cutting off the edge material for cavity array 23, to avoid dents on the surface of the substrate 3 caused by the clamps 14, removing the clamps 14 and the locators 13, freezing the water layer 16 into an ice layer 24 under the refrigeration conditions of the refrigeration equipment 12 and the in-situ freezing fixturing shell 11, clamping the workpiece by using the freezing stickiness of the ice layer 24, as shown in FIG. 13, and completing cutoff of the edge material for cavity array 23, as shown in FIG. 12. At this point, the machining of the integrated thin-walled array structure is completed.

The in-situ freezing machining method for an integrated thin-walled array structure proposed by the present invention realizes in-situ freezing clamping of workpieces, avoids error accumulation caused by repeated installation of the fixture, and can refrigerate efficiently, suppress ambient and cutting thermal interference, and ensure the stability of freezing fixture. The liquidity of water is fully used, and the flexibility is high, which can meet the clamping and machining requirements of the integrated thin-walled array structure, improve the machining efficiency and save cost; the freezing stickiness and rigidity of ice are used to realize the reliable freezing of workpieces, effectively suppress vibration and greatly reduce machining deformation; and the low temperature performance of ice can effectively reduce the local cutting temperature and avoid thermal deformation.

The invention claimed is:

1. An in-situ freezing machining method for an integrated thin-walled array structure, wherein the method is realized based on an in-situ freezing fixturing system which is composed of a freezing device, an auxiliary device and a refrigeration system;

the freezing device comprises an in-situ freezing fixturing shell and an insulation lid; the in-situ freezing fixturing shell has the function of heat preservation and is provided with a refrigeration tube inside, and refrigeration is realized through flow of liquid nitrogen in the refrigeration tube; and the insulation lid is used for heat preservation in the freezing process;

the auxiliary device comprises clamps, a template and locators, wherein the template is arranged in the in-situ freezing fixturing shell, the locators and the template are used for locating a blank, and the clamps are used for clamping the edge of the blank;

the refrigeration system comprises a liquid nitrogen tank, a nozzle and refrigeration equipment, wherein the refrigeration equipment is connected with the refrigeration tube in the in-situ freezing fixturing shell to control the flow of liquid nitrogen into the in-situ freezing fixturing shell so as to realize the control of the refrigeration power; and the nozzle is connected with the liquid nitrogen tank to realize local spraying of liquid nitrogen for machining;

the in-situ freezing machining method comprises the following steps:

step 1: in-situ freezing machining of cup array fixing the in-situ freezing fixturing shell on a machine tool platform, wherein the template, the clamps and the locators are fixedly connected in the in-situ freezing fixturing shell, and hoisting the blank onto the template, wherein the template is provided with a cup slot matched with the cup array, and the surface of the template is coated with a water layer; locating the side surface of the blank by the locators, and compressing the edge of the blank by the clamps; machining the cup array by a cutter:

first, cutting off the area among cups in the cup array, and reserving edge material for cup array to form a cup array groove; second, carrying out rough machining and finish machining of the outer walls of the cups; finally, carrying out rough machining of the inner walls of the cups; cleaning up chips, filling water in the cup array groove and the cup array, covering the in-situ freezing fixturing shell with the insulation lid, starting the refrigeration equipment, and controlling the in-situ freezing fixturing shell to refrigerate and freeze the water; after freezing, removing the insulation lid, carrying out in-situ freezing machining of the inner walls of the cups in the cup array by the cutter, and during machining, keeping the refrigerating effect of the refrigeration equipment and the in-situ freezing fixturing shell all the time to prevent melting of ice caused by ambient thermal interference; after completing in-situ freezing machining, melting the ice and draining waste water; and during the process of cutting off the edge material for cup array, to avoid dents on the surface of the substrate caused by the clamps, removing the clamps and the locators, freezing the water layer into an ice layer under the refrigeration conditions of the refrigeration equipment and the in-situ freezing fixturing shell, clamping a workpiece by using the freezing stickiness of the ice layer, and completing cutoff of the edge material for cup array;

step 2: in-situ freezing machining of cavity array hoisting and turning over, and inserting the cup array into the cup slot of the template, wherein the surface of the template is coated with a water layer; locating the workpiece by the locators, and compressing the workpiece by the clamps; machining the cavity array by the cutter:

first, cutting off the area among cavities in the cavity array, and reserving edge material for cavity array to form a cavity array groove; second, carrying out rough machining and finish machining of the outer walls of the cavities; finally, carrying out rough machining of the inner walls of the cavities; cleaning up chips, filling water in the cavity array groove and the cavity array, covering the in-situ freezing fixturing shell with the insulation lid, starting the refrigeration equipment, and controlling the in-situ freezing fixturing shell to refrigerate and freeze the water; after freezing, removing the insulation lid, carrying out in-situ freezing machining of the inner walls of the cavities in the cavity array by the cutter, and during machining, keeping the refrigerating effect of the refrigeration equipment and the in-situ freezing fixturing shell all the time to prevent melting of the ice caused by ambient thermal interference; after completing in-situ freezing machining, melting the ice and draining waste water; and during the process of cutting off the edge material for cavity array, removing the clamps and the locators, freezing the water layer into an ice layer under the refrigeration conditions of the refrigeration equipment and the in-situ freezing fixturing shell, clamping the workpiece by using the freezing stickiness of the ice layer, and completing cutoff of the edge material for cavity array;

at this point, the machining of the integrated thin-walled array structure is completed.

2. The in-situ freezing machining method according to claim 1, wherein during the freezing machining process of the inner walls of the cups in the cup array and the inner walls of the cavities in the cavity array, the nozzle is connected with the liquid nitrogen tank, and liquid nitrogen is locally sprayed for machining by following the machining track to avoid melting of the ice caused by cutting heat.

* * * * *